United States Patent
Lin et al.

(10) Patent No.: US 10,991,083 B2
(45) Date of Patent: *Apr. 27, 2021

(54) DIRECTIONAL BILATERAL FILTERING WITH IMPROVED NOISE REDUCTION ALONG EDGES

(71) Applicant: Apple Inc., Cupertino, CA (US)

(72) Inventors: Sheng Lin, San Jose, CA (US); Maxim Smirnov, Wilsonville, OR (US); David R. Pope, Fremont, CA (US); Farhan Baqai, Fremont, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/020,626

(22) Filed: Sep. 14, 2020

(65) Prior Publication Data
US 2020/0410652 A1 Dec. 31, 2020

Related U.S. Application Data

(63) Continuation of application No. 16/358,117, filed on Mar. 19, 2019, now Pat. No. 10,825,154.

(51) Int. Cl.
*G06T 5/20* (2006.01)
*G06T 7/13* (2017.01)
(Continued)

(52) U.S. Cl.
CPC ............... *G06T 5/20* (2013.01); *G06T 5/002* (2013.01); *G06T 7/13* (2017.01); *H04N 9/045* (2013.01);
(Continued)

(58) Field of Classification Search
CPC ............. G06T 5/20; G06T 7/13; G06T 5/002; G06T 2207/20028; G06T 2207/20192; H04N 9/045
See application file for complete search history.

(56) References Cited

U.S. PATENT DOCUMENTS 7,373,013 B2 5/2008 Anderson
8,391,628 B2 3/2013 Huang et al.
(Continued)

FOREIGN PATENT DOCUMENTS

CN 104794692 A 7/2015

*Primary Examiner* — Diane D Mizrahi
(74) *Attorney, Agent, or Firm* — Fenwick & West LLP

(57) ABSTRACT

Embodiments relate to a bilateral filter circuit for directional filtering of an image. The directional bilateral filter circuit determines an edge direction and a weight for the edge direction by processing differences between pixel values of pixels in a first block of pixels in the image. The bilateral filter circuit determines non-directional taps for pixels in a second block by processing pixel locations, and determines directional taps by processing differences between pixel values, gradient information for the second block and the edge direction. The bilateral filter circuit determines final filter taps for pixels in the second block by blending corresponding non-directional taps and directional taps using the weight. The bilateral filter circuit obtains a pixel value of a filtered image by multiplying the final filter taps to corresponding pixel values of the pixels in the second block and adding the multiplied values.

20 Claims, 7 Drawing Sheets

(51) Int. Cl.
*G06T 5/00* (2006.01)
*H04N 9/04* (2006.01)

(52) U.S. Cl.
CPC ............... *G06T 2207/20028* (2013.01); *G06T 2207/20076* (2013.01); *G06T 2207/20192* (2013.01)

(56) References Cited

U.S. PATENT DOCUMENTS

| | | |
|---|---|---|
| 8,493,482 B2 | 7/2013 | Cote et al. |
| 8,995,749 B2 | 3/2015 | Bryll |
| 10,825,154 B2 * | 11/2020 | Lin .................. G06T 5/002 |
| 2018/0270480 A1 | 9/2018 | Zhang et al. |

* cited by examiner

DIRECTIONAL BILATERAL FILTERING WITH IMPROVED NOISE REDUCTION ALONG EDGES

CROSS REFERENCE TO RELATED APPLICATIONS

This application is a continuation of U.S. application Ser. No. 16/358,117, filed Mar. 19, 2019, which is incorporated by reference in its entirety.

BACKGROUND

1. Field of the Disclosure

The present disclosure relates a circuit for processing images and more specifically to a circuit for performing bilateral filtering on an image.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Bilateral filtering of image data can be performed to achieve noise reduction and preserve edges in an image, e.g., to reduce noise in an image without producing blurring edges. Bilateral filters are generally effective at producing clean flat regions while preserving sharp edges in the image. However, bilateral filters are less effective in producing cleaner and better-defined edges. Hence there is a need to provide an enhanced version of the bilateral filters to produce clean edges.

SUMMARY

Embodiments relate to directional and gradient detection of image data to reduce noise and enhance edges in an image. A bilateral filter circuit for directional and gradient detection first determines an edge direction for a block of pixels by processing a pixel value of a center pixel in the block and first pixel values of a first subset of pixels in the image within a first distance from the pixel. The directional bilateral filter circuit also determines a weight (confidence value) for the edge direction by processing differences between pixel values of the pixels in the first subset of pixels. The directional bilateral filter circuit determines non-directional taps for pixels of a second subset in the image within a second distance from the pixel, each non-directional tap determined by processing a location of each pixel in the second subset and a pixel difference between the pixel value of the pixel and a pixel value of each pixel of the second subset. The directional bilateral filter circuit also determines directional taps for the pixels of the second subset, each directional tap determined by processing the edge direction, the difference and gradient information for the second subset. The directional bilateral filter circuit determines final filter taps for the pixels of the second subset by blending the non-directional taps with the corresponding directional taps using the weight. The directional bilateral filter circuit obtains a pixel value of a filtered image by multiplying the final filter taps to corresponding pixel values of the pixels in the second subset and adding the multiplied values.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a bilateral filter circuit for directional filtering per pixel by applying bilateral filtering to each pixel of the image. The bilateral filter circuit first determines an edge direction for a subset of pixels (e.g., 5×5 pixels) and a weight for the edge direction indicating a level of confidence about the determined edge direction. The bilateral filter circuit determines filter taps for a block of pixels (e.g., 5×5 pixels) within a defined spatial distance from a center pixel. Each filter tap is determined by blending a corresponding non-directional tap having a photometric component and a spatial component with a corresponding directional tap that depends on the edge direction. The bilateral filter circuit obtains a pixel value of a filtered image by multiplying the filter taps to corresponding pixel values of the pixels in the block and adding the multiplied values.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
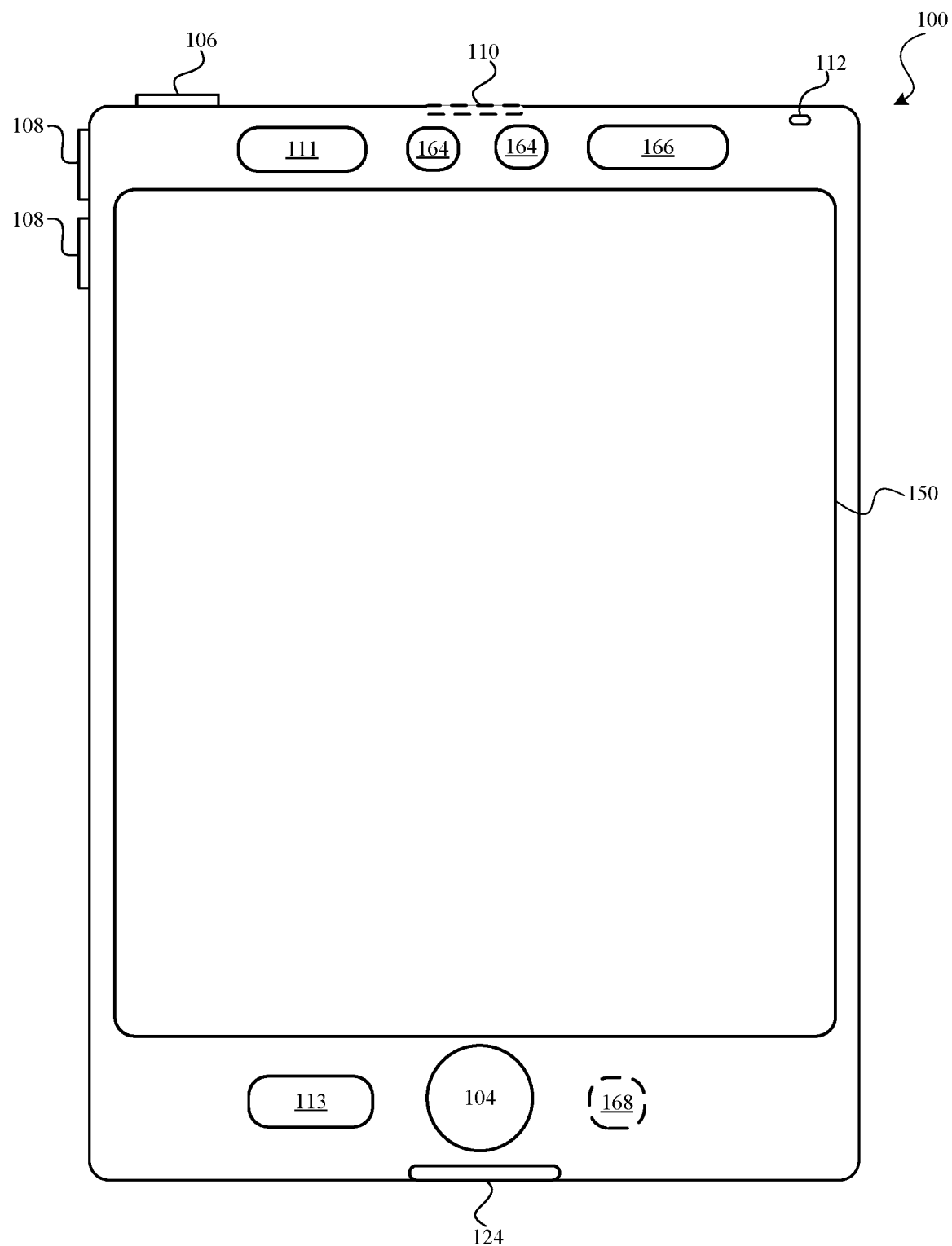
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
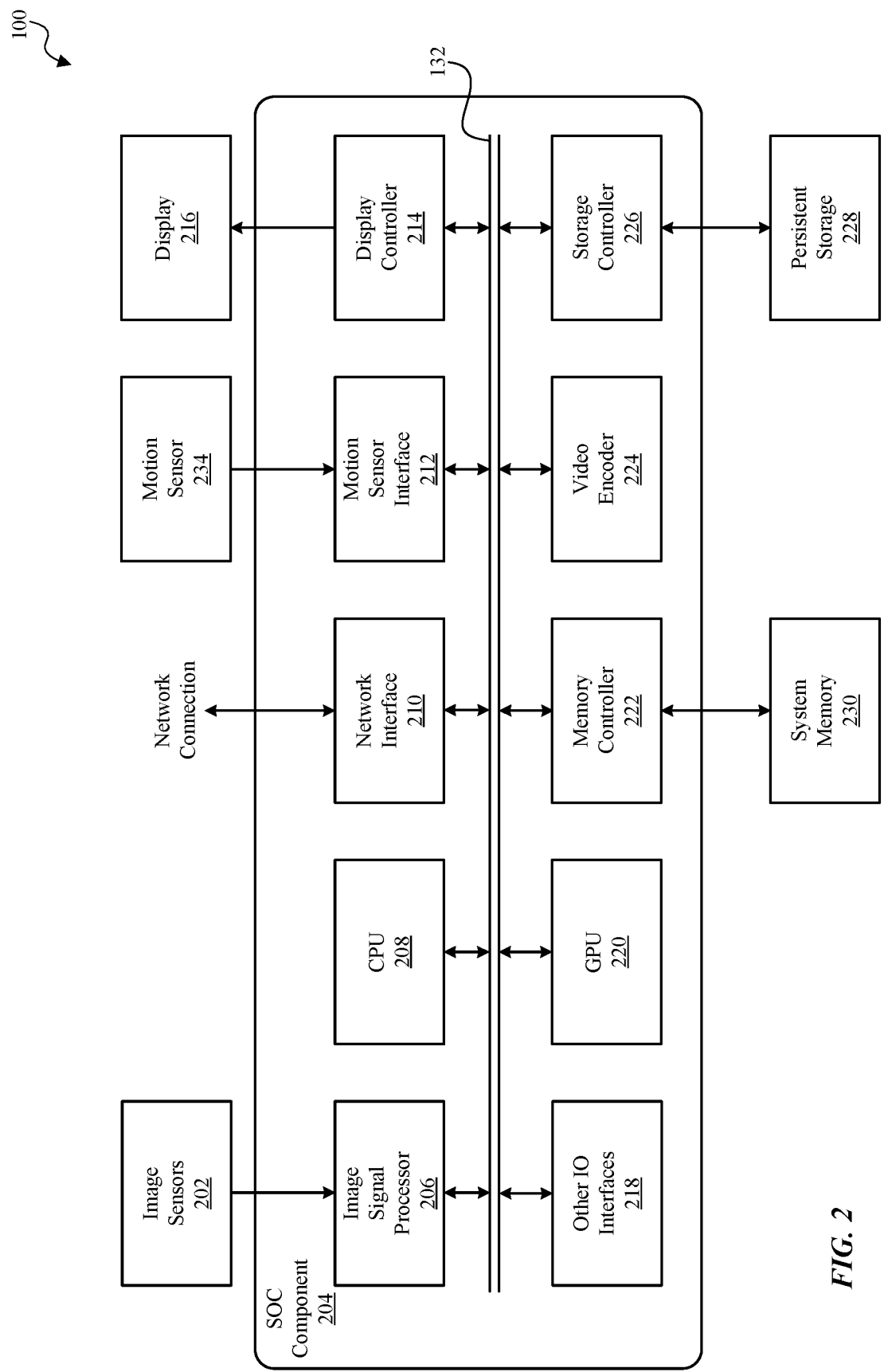
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
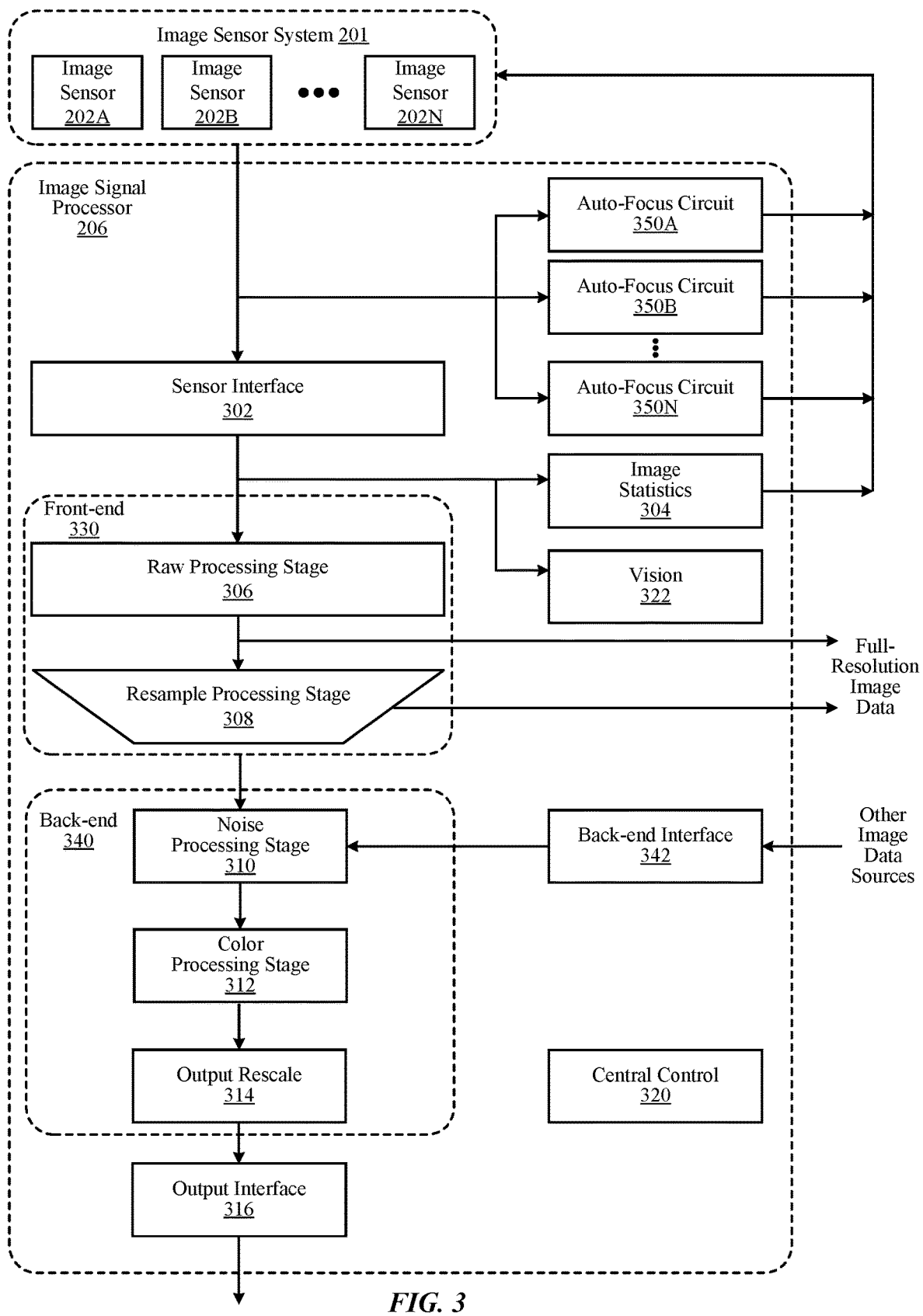
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipeline Associated with Directional Bilateral Filtering Circuit

Figure 4:
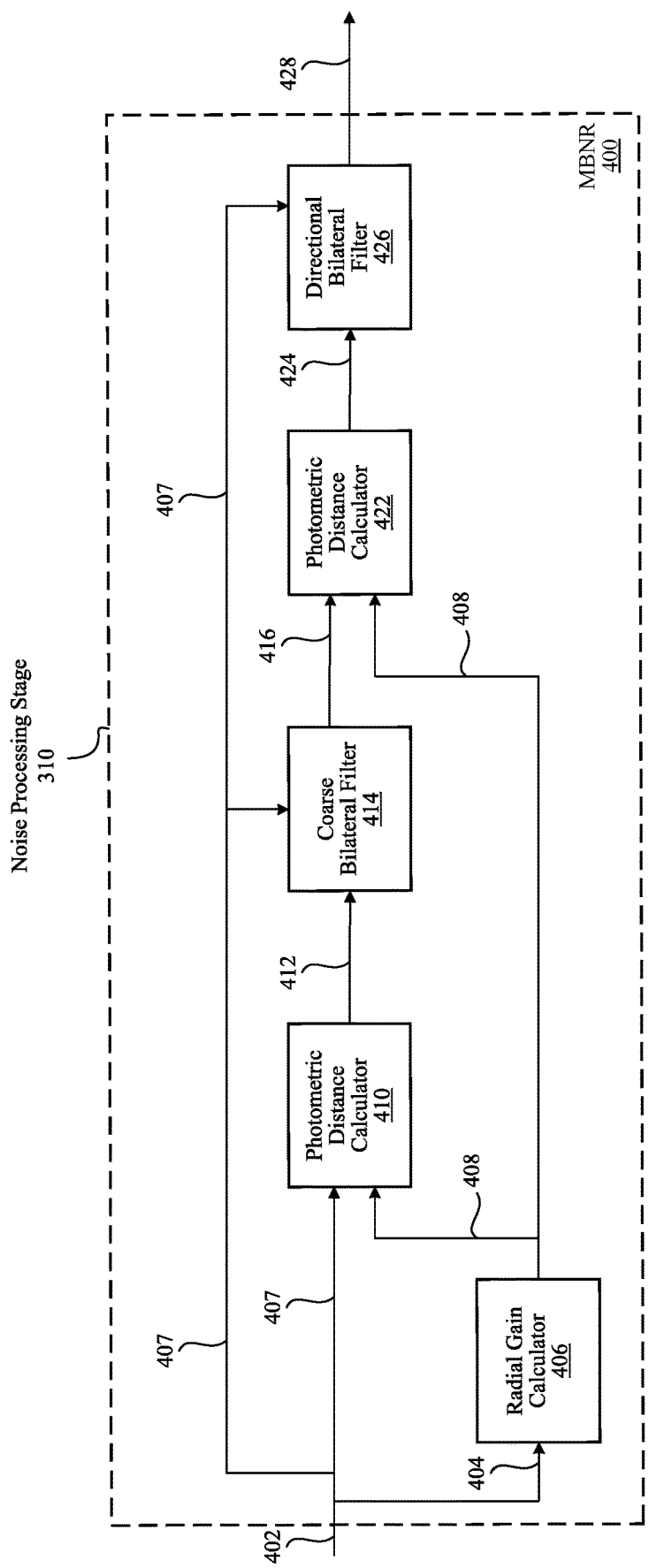
FIG. 4 is a block diagram illustrating a portion of the image processing pipeline including a directional bilateral filter circuit, according to one embodiment.

FIG. 4 is a block diagram illustrating a portion of the image processing pipeline including directional bilateral filter circuit 426, according to one embodiment. In the embodiment of FIG. 4, directional bilateral filter circuit 426 is part of multiple band noise reduction (MBNR) circuit 400 included in noise processing stage 310. MBNR circuit 400 performs noise reduction on multiple bands of an input image captured by one or more image sensors 202 and processed by front end 330 before reaching noise processing stage 310. Directional bilateral filter circuit 426 may perform bilateral filtering of an image pyramid comprising multiple scales of the input image where the lowest scale (e.g., scale 0) is an un-scaled version of the input image and each subsequent scale (e.g., scales 1, 2, . . . , N) is a downscaled version of the previous scale by a factor of two in both horizontal and vertical dimensions. The un-scaled version can include a single color component (e.g., luma component for the input image in YCbCr 4:2:0 format) or multiple color components (e.g., Y, Cb and Cr components for the input image in YCbCr 4:4:4 format). The downscaled versions of the input image include multiple color components.

In addition to directional bilateral filter circuit 426, MBNR circuit 400 further includes radial gain calculator 406, photometric distance calculator 410, coarse bilateral filter 414, and photometric distance calculator 422. Radial gain calculator 406 determines radial gain 408 for each pixel of image scale 402 (e.g., scale 0, or some other scale 1, 2, . . . , N of an input image) as a function of spatial location 404 of the pixel. A radial gain is used to compensate any spatial gain applied to pixel values in an image processing pipeline up to MBNR circuit 400, e.g., to perform lens shading correction. Radial gain 408 determined by radial gain calculator 406 is passed onto photometric distance calculators 410 and 422. Photometric distance calculator 410 determines photometric distances 412 (e.g., Mahalanobis distances) between a pixel and other pixels in a block of pixels of image scale 402 by processing pixel values 407 of the block. Note that the other pixels in the block are within a defined spatial distance from the pixel that represents a center pixel in the block (e.g., 5×5 pixels).

Photometric distances 412 determined by photometric distance calculator 410 are passed to coarse bilateral filter 414. Coarse bilateral filter 414 determines coarse filter coefficients by processing photometric distances 412. Coarse bilateral filter 414 perform summation of products of coarse filter coefficients and corresponding pixel values 407 of the center pixel and the other pixels in the block to generate coarse filtered pixel value 416 for the center pixel. Coarse filtered pixel value 416 is passed onto photometric distance calculator 422. Photometric distance calculator 422 determines refined photometric distances 424 (e.g., Mahalanobis distances) between the center pixel and the other pixels in the block by processing coarse filtered pixel values 416 for the center pixel and the other pixels in the block and corresponding radial gains 408 for the pixels in the block.

Refined photometric distances 424 are passed onto directional bilateral filter circuit 426 for directional filtering. Directional bilateral filter circuit 426 determines directional filter coefficients for the center pixel and the other pixels in the block by processing refined photometric distances 424. Directional bilateral filter circuit 426 performs summation of products of the directional filter coefficients and corresponding pixel values 407 of the block to generate filtered pixel value 428 for a pixel in a filtered image. Directional bilateral filter circuit 426 improves noise reduction along edges thus producing cleaner and better defined edges in the filtered image. More details about structure and operation of directional bilateral filter circuit 426 for directional filtering are provided below in detail in conjunction with FIGS. 5-7.

Example Directional Bilateral Filter Circuit

Figure 5:
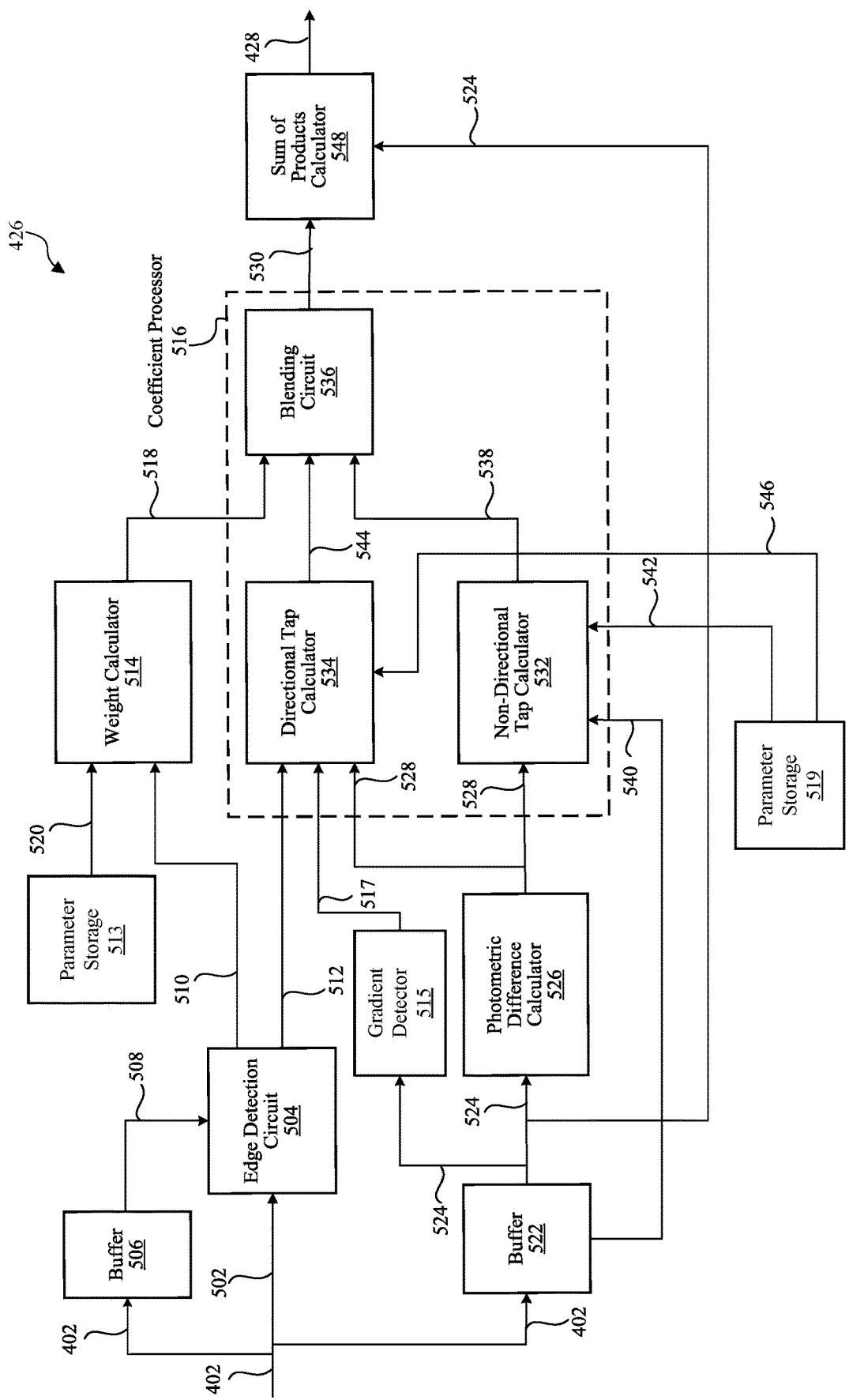
FIG. 5 is a detailed block diagram illustrating the directional bilateral filter circuit, according to one embodiment.

FIG. 5 is a detailed block diagram illustrating directional bilateral filter circuit 426, according to one embodiment. Image scale 402 representing an unscaled or scaled version of an input image is filtered by directional bilateral filter circuit 426. As discussed in conjunction with FIG. 4, image scale 402 may include only luma component or may include luma and chroma components. For example, if image scale 402 is an unscaled version of the input image in YCbCr 4:2:0 format, image scale 402 includes only Y component. Alternatively, if image scale 402 is an unscaled version of the input image in YCbCr 4:4:4 format or in YCbCr 4:2:2 format, image scale 402 may include Y, Cr, Cb components. Otherwise, if image scale 402 is a downscaled version of the input image, image scale 402 includes Y, Cr, Cb components. Directional bilateral filter circuit 426 determines filter coefficients (e.g., final filter taps 530) for each color component for each block of pixels in image scale 402. Center pixel value 502 of a center pixel in a block of image scale 402 (e.g., block of 5×5 pixels) is sent to edge detection circuit 504 of directional bilateral filter circuit 426. Further, first pixel values of a first subset of pixels in image scale 402 within a first spatial distance from the pixel are stored in buffer 506 and passed onto edge detection circuit 504 as pixel values 508. Pixel values 508 may correspond to other pixels in the block of 5×5 pixels in image scale 402.

Edge detection circuit 504 is a circuit that detects an edge in the block of pixels. Pixels that are located on the edge that includes the center pixel may obtain more weight (e.g., higher filter coefficients) in bilateral filtering. Edge detection circuit 504 determines set of direction values 510 for a set of edge directions by processing absolute differences between center pixel value 502 and each pixel value 508 of other pixels in the block of pixels and absolute differences between certain pairs of pixels values 508. Each direction value 510 represents a likelihood that the block of pixels is part of an edge extending in one of the set of edge directions. Edge detection circuit 504 determines edge direction 512 for the block of pixels by comparing set of direction values 510.

Figure 6:
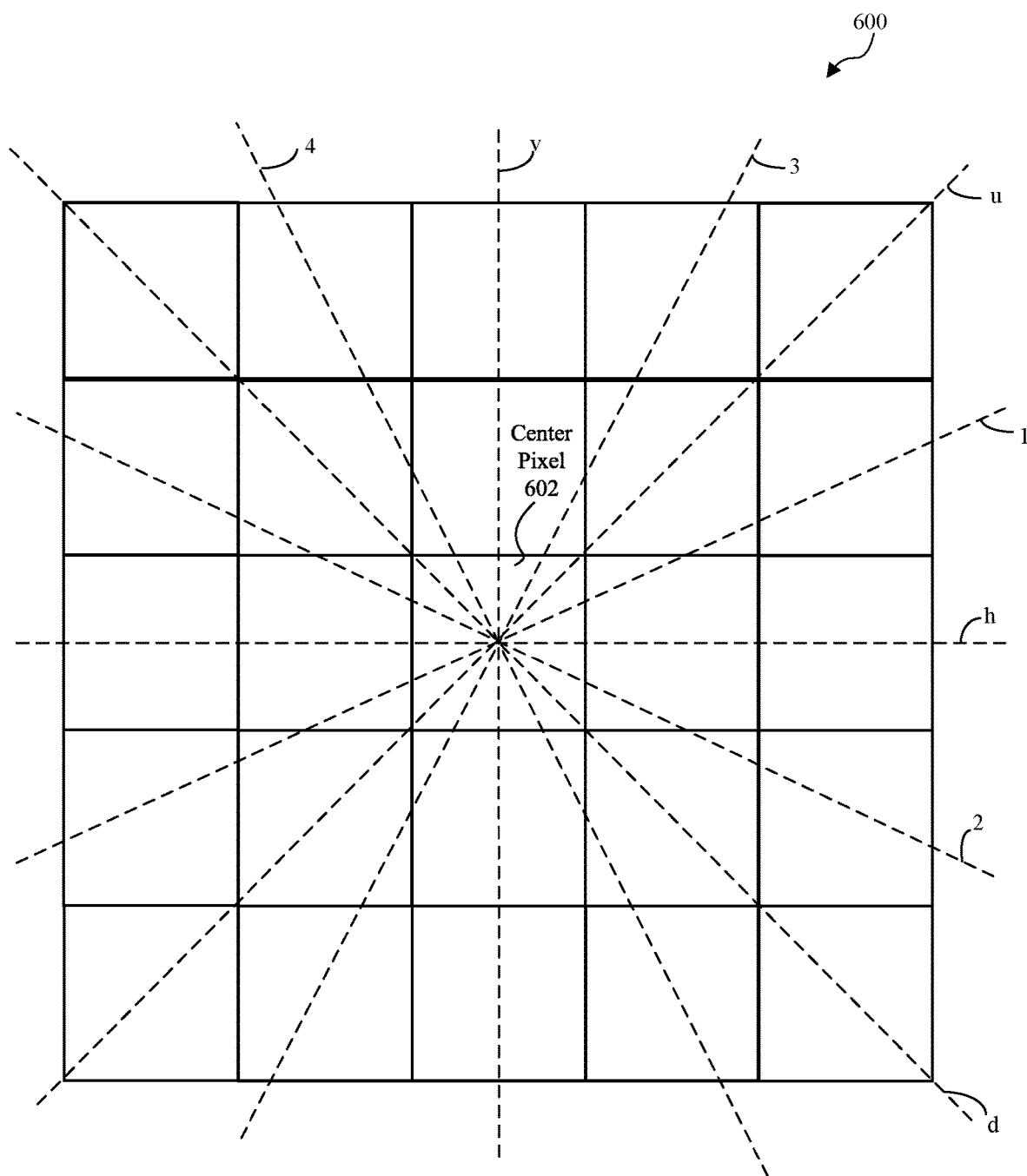
FIG. 6 is a conceptual diagram illustrating possible edge directionality for a pixel in an image, according to one embodiment.

The direction of the edge may be represented by a horizontal line (h), a vertical line (v), an upward diagonal line (u), a downward diagonal line (d), a first upward diagonal line (1) at +22.5° relative to the horizontal line, a second downward diagonal line (2) at −22.5° relative to the horizontal line, a third upward diagonal line (3) at +67.5° relative to the horizontal line, and a fourth downward diagonal line (4) at −67.5° relative to the horizontal line, as illustrated in FIG. 6 for block of pixels 600 having a central pixel 602. In one embodiment, edge detection circuit 504 computes the following energy parameters Eh, Ev, Eu, Ed, E1, E2, E3, E4 (corresponds to direction values 510) each representing energy along a horizontal direction, a vertical direction, an upward diagonal direction, a downward diagonal direction, a first upward diagonal direction, a second downward diagonal direction, a third upward diagonal direction, and a fourth downward diagonal direction respectively, according to following equations:

$$Eh=(D33\_32+D33\_34+D23\_22+D23\_24+D43\_42+D43\_44)/8 \quad (1)$$

$$Ev=(D33\_23+D33\_43+D32\_22+D32\_42+D34\_24+D34\_44)/8 \quad (2)$$

$$Eu=\{D33\_24+D33\_42+D32\_23+D34\_43+(D32\_41+D23\_14+D34\_25+D43\_52)/2\}/8 \quad (3)$$

$$Ed=\{D33\_22+D33\_44+D32\_43+D34\_23+(D32\_21+D43\_54+D34\_45+D23\_12)/2\}/8 \quad (4)$$

$$E1=(D33\_25+D33\_41+D23\_15+D23\_31+D43\_35+D43\_51)/8 \quad (5)$$

$$E2=(D33\_21+D33\_45+D23\_11+D23\_35+D43\_31+D43\_55)/8 \quad (6)$$

$$E3=(D33\_14+D33\_52+D32\_13+D32\_51+D34\_15+D34\_53)/8 \quad (7)$$

$$E4=(D33\_12+D33\_54+D32\_11+D32\_53+D34\_13+D34\_55)/8 \quad (8)$$

where Dij_mn indicates the absolute pixel luma value difference between pixels P(i,j) and P(m, n) (i, j, m, n are integers from 1 to 5 if 5×5 pixel block used and P(3,3) is the center pixel). Direction values 510 (or the energy parameters) obtained by Equations 1 through 8 are then compared to determine edge direction 512. Edge direction 512 is sent to coefficient processor 516 for processing. Direction values 510 are passed onto weight calculator circuit 514 for processing.

Weight calculator circuit 514 determines weight 518 (also referred to as "confidence value") indicating a likelihood or confidence that the direction represented by edge direction 512 is actually present in the block of pixels (where weight 518 has a value between 0 and 1). Weight calculator circuit 514 determines weight 518 for edge direction 512 by processing direction values 510. Weight 518 can be determined by taking into account various factors, including but not limited to, (i) direction values 510, Eh, Ev, Eu, Ed, E1, E2, E3, E4 (ii) the average of direction values 510, (iii) the smallest value of direction values 510, (iv) direction value 510 of a direction perpendicular to a direction with the smallest value, (v) a noise standard deviation for the center pixel, and (vi) predetermined and configurable values of knee and slope parameters 520 input into weight calculator circuit 514. Each combination of the slope and the knee value is stored in parameter storage 513. Weight 518 is also sent to coefficient processor 516 for processing.

Second pixel values of a second subset of pixels in image scale 402 within a second spatial distance from the center pixel are stored in buffer 522 and passed onto photometric difference calculator 526 as pixel values 524. In an embodiment, pixel values 524 correspond to a block of 5×5 pixels in image scale 402 where center pixel value 502 corresponds to a center pixel in the block. Photometric difference calculator 526 computes a photometric difference for each pixel of the block as a difference between center pixel value 502 of the center pixel and corresponding pixel value 524. Photometric difference calculator 526 may further normalize the photometric difference for each pixel of the block using a noise standard deviation of the center pixel to obtain normalized difference (ND) 528 for each pixel of the block. ND 528 for each pixel of the block is sent to coefficient processor 516 for processing.

Gradient detector 515 is a circuit that detects a gradient in pixels of the second subset (e.g., the 5×5 pixel block) stored in buffer 522, and determines locations in the pixel block where some pixels are on the gradient. Some pixels along a line in the pixel block are on the gradient when these pixels are on a gradually increasing or decreasing slope below a threshold with no change in a gradient direction. Whether a pixel is on such location or not is determined by comparing pixel value differences along lines (e.g., lines v, u, h, d, 1, 2, 3, 4 shown in FIG. 6). If a difference of pixel gradient from one pixel to another along a line normalized by the noise standard deviation value of the center pixel is below a defined threshold, these pixels are determined to be on locations where a gradient is changing gradually. Gradient detector 515 generates gradient information 517 indicating which pixels in the pixel block are on a gradient. Pixels on a gradient may obtain more weight (e.g., higher filter coefficients) in bilateral filtering. The purpose of gradient detection is to reduce posterization effect after bilateral noise filtering. Gradient information 517 is sent to coefficient processor 516 for processing.

Coefficient processor 516 is a circuit that determines final filter taps 530 (final filter coefficients) for multiplying with pixel values 524 of the block at sum of products calculator 548, based on the directionality of pixels in the block (e.g., the second subset of pixels stored in buffer 522) by processing ND 528 for each pixel in the block, parameters that include knee values and slope values, edge direction 512, weight 518, gradient information 517 and information about spatial location of each pixel in the block, as described below in detail. In one embodiment, 25 final filter taps 530 for 5×5 pixels in the block are determined by coefficient processor 516. Coefficient processor 516 includes non-directional tap calculator 532, directional tap calculator 534, and blending circuit 536.

Non-directional tap calculator 532 is a circuit that determines non-directional tap 538 for each pixel of the block and for each color component in image scale 402. Non-directional tap 538 for each pixel in the block is a component of final filter tap 530 for each pixel in the block that does not depend neither on edge direction 512 nor on information whether that pixel is located on an edge and/or a gradient. In one embodiment, 25 non-directional taps 538 for 5×5 pixels in the block are determined per color component by non-directional tap calculator 532. Non-directional tap calculator 532 may be bypassed if weight 518 is equal to 1, e.g., if there is a definite edge direction indicated by edge direction 512. In such case, final filter taps 530 are equal to directional taps 544 determined by directional tap calculator 534.

Non-directional tap calculator 532 determines non-directional taps 538, tap_cc, for each pixel and for each color component in the block by processing predetermined non-directional spatial coefficients NFcoeff_cc and a photometric factor Phi_cc for the color component, wherein "cc" can refer to Y, Cb or Cr depending on a color component being processed. Non-directional taps 538 for a color component, tap_cc, can be determined by multiplying each of the non-directional spatial coefficient with a corresponding photometric factor, e.g., $$tap\_cc=Phi\_cc*NFcoeff\_cc \quad (9)$$

The photometric factor Phi_cc for each pixel of the block and for the color component is determined by processing ND 528 and parameters 542 that include knee values and slope values for the color component. The photometric factor Phi_cc is a photometric component of non-directional tap 538 and represents an attenuation factor between 0 and 1. For example, the value of Phi_cc of 1 corresponds to no attenuation to final filter tap 530, whereas the value of Phi_cc of 0 corresponds to maximum attenuation to final filter tap 530. Each combination of the slope and the knee value is stored in parameter storage 519. Spatial coefficient NFcoeff_cc for each pixel of the block is a function of spatial location 540 of each pixel in the block. In some embodiments, values of spatial coefficients NFcoeff_cc are symmetric relative to the center pixel, e.g., there are 6 different values for spatial coefficients NFcoeff_cc for the block of 5×5 pixels. Alternatively, each spatial coefficient NFcoeff_cc may have a unique value depending on a spatial location of a corresponding pixel in the block. Also, spatial coefficient NFcoeff_cc for each pixel may vary for different color components. Non-directional tap calculator 532 may obtain a spatial coefficient NFcoeff_cc for each pixel of the block and for a corresponding color component from a coefficient storage that is part of non-directional tap calculator 532 (not shown in FIG. 5). Non-directional tap 538 for each color component, tap_cc, is passed onto blending circuit 536 for processing.

Directional tap calculator 534 is a circuit that determines directional tap 544 for each pixel of the block and for each color component in image scale 402. Directional tap 544 for each pixel in the block is a component of final filter tap 530 for each pixel in the block that depends on edge direction 512 and information whether that pixel is located on an edge and/or a gradient. In one embodiment, 25 directional taps 544 for 5×5 pixels in the block are determined per color component by directional tap calculator 534. Directional tap calculator 534 may be bypassed if weight 518 is zero, e.g., if there is no edge direction, and final filter taps 530 are non-directional taps 538 determined by non-directional tap calculator 532. Directional tap calculator 534 may determine directional tap 544 for each pixel in the block and for each color component, tap2_cc, according to the following equation:

$$\text{tap2\_cc} = \text{Phi2\_cc} * \text{Pcoeff\_cc} \qquad (10)$$

where Phi2_cc is a photometric factor for a corresponding color component and Pcoeff_cc is a directional spatial coefficient for the color component.

The photometric factor Phi2_cc for each pixel of the block and for the color component is determined by processing ND 528 and parameters 546 that include knee values and slope values for the color component. The photometric factor Phi2_cc represents a photometric component of directional tap 544 and represents an attenuation factor between 0 and 1. For example, the value of Phis_cc of 1 corresponds to no attenuation to final filter tap 530, whereas the value of Phi2_cc of 0 corresponds to maximum attenuation to final filter tap 530. The pair of slope and the knee value may vary depending on whether the pixel is (i) on an edge, (ii) on a gradient or (iii) neither on the edge nor on a gradient, determined based on gradient information 517 from gradient detector 515 and edge direction 512 from edge detection circuit 504. Each combination of the slope and the knee value is stored in parameter storage 519, and the corresponding pair of slope and the knee value are passed as parameters 546 from parameter storage 519 to directional tap calculator 534. The spatial coefficient Pcoeff_cc for each pixel of the block is a function of spatial location of each pixel in the block and may have different values depending on the locations relative to the center pixel as well as whether the pixel is (i) on an edge, (ii) on a gradient or (iii) neither on the edge nor a gradient, which is determined based on gradient information 517 from gradient detector 515 and edge direction 512 from edge detection circuit 504. Also, the spatial coefficient Pcoeff_cc may vary for different color components. The spatial coefficient Pcoeff represents a spatial component of directional tap 544. Directional tap calculator 534 may obtain a spatial coefficient Pcoeff for each pixel of the block and for a corresponding color component from a coefficient storage that is part of directional tap calculator 534 (not shown in FIG. 5.) Directional tap 544 for each color component, tap2_cc, is also passed onto blending circuit 536 for processing.

Blending circuit 536 is a circuit that determines final filter taps 530 for pixels in the block and for each color component (e.g., Y, Cb, Cr color component) in image scale 402 using weight 518 for the block (a confidence value for an edge), non-directional taps 538 for a corresponding color component for the block, and directional taps 544 for the color component for the block. Final filter taps 530 for the color component are obtained by blending corresponding directional taps 544 and corresponding non-directional taps 538. Weight 518 operates as a weighing factor w between 0 and 1 that gives a higher weight to directional taps 544 as the confidence value increases. The following is one example way of determining final filter tap 530 for each pixel in the block for the color component:

$$\text{Final FilterTap\_cc} = w \times \text{tap2\_cc} + (1-w) \times \text{tap\_cc} \qquad (11)$$

Final filter taps 530 determined for the pixel block and for each color component are then sent to sum of products calculator 548 for multiplication.

Sum of products calculator 548 is a circuit that performs summation of products of pixel values 524 of the block for each color component of image scale 402 and corresponding final filter taps 530 for the color component to obtain filtered pixel value 428 for the pixel in the block for each color component. Directional bilateral filter circuit 426 performs the aforementioned filtering operations for each pixel in image scale 402 and for each color component in image scale 402. Thus, directional bilateral filter circuit 426 generates filtered pixel value 428 for each pixel and each color component in a filtered image scale.

Example Process for Performing Directional Filtering

Figure 7:
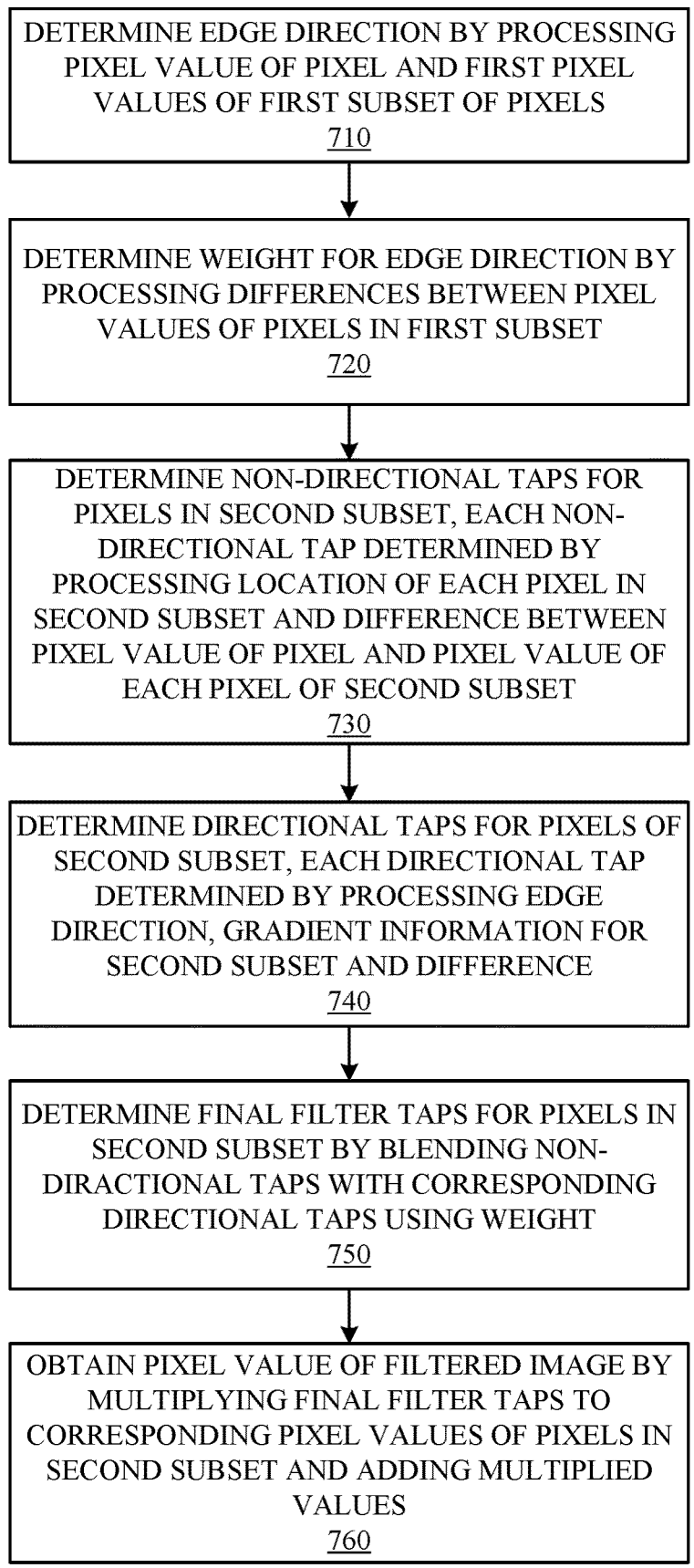
FIG. 7 is a flowchart illustrating a method of directional filtering, according to one embodiment.

FIG. 7 is a flowchart illustrating a method of directional filtering, according to one embodiment. The method may include additional or fewer steps, and steps may be performed in different orders. Directional bilateral filter circuit 426, as described with reference to FIG. 5, determines 710 (via edge detection circuit 504) an edge direction by processing a pixel value of a pixel of the image and first pixel values of a first subset of pixels in the image within a first distance from the pixel. Directional bilateral filter circuit 426 determines 720 (e.g., via weight calculator circuit 514) a weight for the edge direction by processing differences between pixel values of the pixels in the first subset of pixels.

Directional bilateral filter circuit 426 determines 730 (e.g., via non-directional tap calculator 532) non-directional taps for pixels of a second subset in the image within a second distance from the pixel, each non-directional tap determined by processing a location of each pixel in the second subset and a difference between the pixel value of the pixel and a pixel value of each pixel of the second subset. Directional bilateral filter circuit 426 determines 740 (e.g., via directional tap calculator 534) directional taps for the pixels of the second subset, each directional tap determined by processing the edge direction, the difference and gradient information for the second subset. The gradient information for the second subset includes information for each pixel in the second subset whether that pixel is located on a gradient.

Directional bilateral filter circuit 426 determines 750 (e.g., via blending circuit 536) final filter taps for the pixels of the second subset by blending the non-directional taps with the corresponding directional taps using the weight. Directional bilateral filter circuit 426 obtains 760 (e.g., via sum of products calculator 548) a pixel value of a filtered image by multiplying the final filter taps to corresponding pixel values of the pixels in the second subset and adding the multiplied values.

The method of FIG. 7 may be performed for each pixel and each color component of the image to generate the filtered image. In some embodiments, the method is performed to provide directional filtering for a single color component (e.g., luma component) of the image. In some other embodiments, the method is performed to provide directional filtering for multiple color components (e.g., luma and chroma components) of the image.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A directional bilateral filter circuit comprising:
    an edge detection circuit configured to determine an edge direction for each pixel in an image by processing a pixel value of each pixel and pixel values of a subset of pixels in the image within a defined distance from each pixel;
    a coefficient processor circuit coupled to the edge detection circuit, the coefficient processor circuit configured to:
        determine a plurality of non-directional taps for the pixels in the subset by processing information about a location of each pixel in the subset and each difference between the pixel value and another pixel value of each pixel in the subset,
        determine a plurality of directional taps for the pixels in the subset by processing at least the edge direction and each difference, and
        determine a plurality of filter taps for the pixels in the subset by processing the non-directional taps and the directional taps; and
    a filter circuit coupled to the coefficient processor circuit, the filter circuit configured to calculate a filtered pixel value of each pixel in a filtered image using the filter taps and the pixel values.

2. The directional bilateral filter circuit of claim 1, wherein:
    the edge detection circuit is further configured to determine a weight for the edge direction by processing differences between each pair of the pixel values; and
    the coefficient processor circuit is further configured to determine each filter tap for each pixel in the subset by blending each of the non-directional taps with a corresponding directional tap of the plurality of directional taps using the weight.

3. The directional bilateral filter circuit of claim 2, wherein the edge detection circuit is further configured to determine the weight for the edge direction by processing at least: a set of direction values for a set of edge directions, a minimum of the set of direction values, an average of the set of direction values, a direction value from the set of direction values associated with a direction perpendicular to a direction associated with the minimum, and a noise standard deviation for each pixel in the image.

4. The directional bilateral filter circuit of claim 1, wherein the edge detection circuit is further configured to:
    determine a set of direction values for a set of edge directions by processing absolute differences between each pair of the pixel values; and
    determine the edge direction for each pixel in the image by processing the set of direction values.

5. The directional bilateral filter circuit of claim 4, wherein each direction value in the set of direction values represents a likelihood that each pixel in the image is part of an edge extending in a corresponding edge direction of the set of edge directions.

6. The directional bilateral filter circuit of claim 1, further comprising a photometric difference calculator circuit coupled to the coefficient processor circuit, the photometric difference calculator circuit configured to:
    compute a corresponding difference of a plurality of differences between the pixel value and the other pixel value of each pixel in the subset; and
    normalize the corresponding difference for each pixel in the subset using a noise standard deviation of each pixel in the image to obtain a corresponding normalized difference of a plurality of normalized differences for each pixel in the subset.

7. The directional bilateral filter circuit of claim 6, wherein the coefficient processor circuit is further configured to:
    determine a photometric factor for each pixel in the subset by processing the corresponding normalized difference, a knee value associated with each pixel in the subset, and a slope value associated with each pixel in the subset;
    determine a spatial coefficient for each pixel in the subset by processing the information about the location of each pixel in the subset relative to an edge having the edge direction, and gradient information for each pixel in the subset indicating whether each pixel in the subset is on a gradient; and
    compute each of the directional taps for each pixel in the subset by multiplying the photometric factor and the spatial coefficient.

8. The directional bilateral filter circuit of claim 6, wherein the coefficient processor circuit is further configured to:
    determine a photometric factor for each pixel in the subset by processing the corresponding normalized difference, a knee value associated with each pixel in the subset, and a slope value associated with each pixel in the subset;
    determine a spatial coefficient for each pixel in the subset as a function of the location of each pixel in the subset; and
    compute each of the non-directional taps for each pixel in the subset by multiplying the photometric factor and the spatial coefficient.

9. The directional bilateral filter circuit of claim 1, further comprising a gradient detector circuit coupled to the coefficient processor circuit, the gradient detector circuit configured to:
    generate gradient information for each pixel in the subset indicating whether each pixel in the subset is located on a gradient, wherein
    the coefficient processor circuit is further configured to determine each of the directional taps for each pixel in the subset by processing the edge direction, each difference, and the gradient information for each pixel in the subset.

10. A method comprising:
determining an edge direction for each pixel in an image by processing a pixel value of each pixel and pixel values of a subset of pixels in the image within a defined distance from each pixel;
determining a plurality of non-directional taps for the pixels in the subset by processing information about a location of each pixel in the subset and each difference between the pixel value and another pixel value of each pixel in the subset;
determining a plurality of directional taps for the pixels in the subset by processing at least the edge direction and each difference;
determining a plurality of filter taps for the pixels in the subset by processing the non-directional taps and the directional taps; and
calculating a filtered pixel value of each pixel in a filtered image using the filter taps and the pixel values.

11. The method of claim 10, further comprising:
determining a weight for the edge direction by processing differences between each pair of the pixel values; and
determining each filter tap for each pixel in the subset by blending each of the non-directional taps with a corresponding directional tap of the plurality of directional taps using the weight.

12. The method of claim 11, further comprising determining the weight for the edge direction by processing at least: a set of direction values for a set of edge directions, a minimum of the set of direction values, an average of the set of direction values, a direction value from the set of direction values associated with a direction perpendicular to a direction associated with the minimum, and a noise standard deviation for each pixel in the image.

13. The method of claim 10, further comprising:
determining a set of direction values for a set of edge directions by processing absolute differences between each pair of the pixel values; and
determining the edge direction for each pixel in the image by processing the set of direction values, each direction value in the set of direction values representing a likelihood that each pixel in the image is part of an edge extending in a corresponding edge direction of the set of edge directions.

14. The method of claim 10, further comprising:
computing a corresponding difference of a plurality of differences between the pixel value and the other pixel value of each pixel in the subset; and
normalizing the corresponding difference for each pixel in the subset using a noise standard deviation of each pixel in the image to obtain a corresponding normalized difference of a plurality of normalized differences for each pixel in the subset.

15. The method of claim 14, further comprising:
determining a photometric factor for each pixel in the subset by processing the corresponding normalized difference, a knee value associated with each pixel in the subset, and a slope value associated with each pixel in the subset;
determining a spatial coefficient for each pixel in the subset by processing the information about the location of each pixel in the subset relative to an edge having the edge direction, and gradient information for each pixel in the subset indicating whether each pixel in the subset is on a gradient; and
computing each of the directional taps for each pixel in the subset by multiplying the photometric factor and the spatial coefficient.

16. The method of claim 14, further comprising:
determining a photometric factor for each pixel in the subset by processing the corresponding normalized difference, a knee value associated with each pixel in the subset, and a slope value associated with each pixel in the subset;
determining a spatial coefficient for each pixel in the subset as a function of the location of each pixel in the subset; and
computing each of the non-directional taps for each pixel in the subset by multiplying the photometric factor and the spatial coefficient.

17. The method of claim 10, further comprising:
generating gradient information for each pixel in the subset indicating whether each pixel in the subset is located on a gradient; and
determining each of the directional taps for each pixel in the subset by processing the edge direction, each difference, and the gradient information for each pixel in the subset.

18. A system, comprising:
an image sensor configured to capture an image having at least one color component; and
a directional bilateral filter circuit comprising:
an edge detection circuit configured to determine an edge direction for each pixel in the image by processing a pixel value of each pixel and pixel values of a subset of pixels in the image within a defined distance from each pixel;
a coefficient processor circuit coupled to the edge detection circuit, the coefficient processor circuit configured to:
determine a plurality of non-directional taps for the pixels in the subset by processing information about a location of each pixel in the subset and each difference between the pixel value and another pixel value of each pixel in the subset,
determine a plurality of directional taps for the pixels in the subset by processing at least the edge direction and each difference, and
determine a plurality of filter taps for the pixels in the subset by processing the non-directional taps and the directional taps; and
a filter circuit coupled to the coefficient processor circuit, the filter circuit configured to calculate a filtered pixel value of each pixel in a filtered image using the filter taps and the pixel values.

19. The system of claim 18, wherein:
the edge detection circuit is further configured to determine a weight for the edge direction by processing differences between each pair of the pixel values; and
the coefficient processor circuit is further configured to determine each filter tap for each pixel in the subset by blending each of the non-directional taps with a corresponding directional tap of the plurality of directional taps using the weight.

20. The system of claim 18, further comprising a gradient detector circuit coupled to the coefficient processor circuit, the gradient detector circuit configured to:
generate gradient information for each pixel in the subset indicating whether each pixel in the subset is located on a gradient, wherein
the coefficient processor circuit is further configured to determine each of the directional taps for each pixel in the subset by processing the edge direction, each difference, and the gradient information for each pixel in the subset.

\* \* \* \* \*